Oct. 19, 1965   M. CASIMIR   3,212,768
HYDRO-PNEUMATIC SHOCK ABSORBER
Filed March 11, 1963
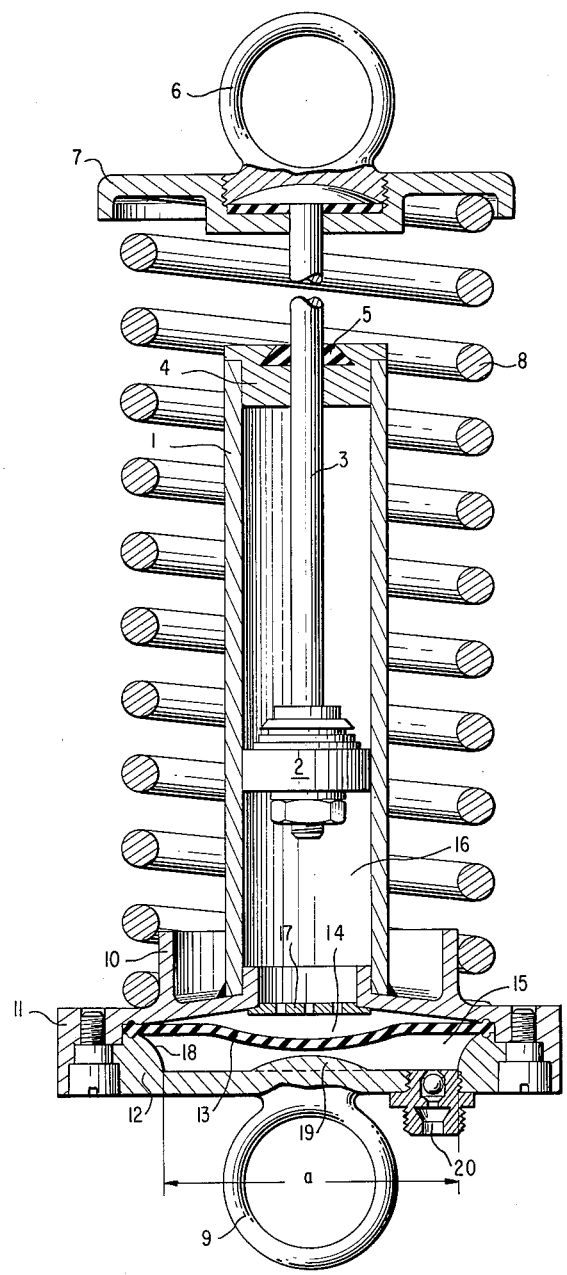
INVENTOR.
MANFRED CASIMIR
BY Dicke & Craig
ATTORNEYS

3,212,768
HYDRO-PNEUMATIC SHOCK ABSORBER
Manfred Casimir, Esslingen-Hegensberg, Germany, assignor to Daimler-Benz Aktiengesellschaft, Stuttgart, Unterturkheim, Germany
Filed Mar. 11, 1963, Ser. No. 264,176
Claims priority, application Germany, Mar. 13, 1962, D 38,349
10 Claims. (Cl. 267—34)

The present invention relates to an improvement and a further development of hydro-pneumatic telescopic shock absorbers, especially for motor vehicles, provided with a connecting head portion constructed as equalization chamber and protruding beyond the diameter of the shock absorber itself.

The present invention essentially consists in so constructing the equalization chamber housing that the latter simultaneously serves as spring-disk for a coil spring surrounding the shock absorber. A further feature of the present invention consists in constructing the equalization chamber of two flat hollow shell-like parts between which is inserted a flexible membrane or diaphragm member separating the gas space from the liquid space.

Such a construction offers the advantage that the shock absorber provided with the equalization chamber may be accommodated in a more or less vertical position within a coil spring without causing the equalization chamber to be filled with liquid and without requiring a separate spring-disk.

In one prior art arrangement the equalization chamber is in communication only by way of an overflow channel open on one side and transversely extending through the cross section of the shock absorber, whence such prior art shock absorber is suitable only for a substantially horizontal arrangement. This means in practice a considerable limitation in the possibilities of use and applications thereof. Additionally, the known prior art arrangement does not provide any suggestion to arrange the shock absorber within a coil spring and to utilize the equalization chamber simultaneously as spring-disk. As compared to those shock absorbers known in the prior art provided with an equalization chamber in which the diameter of the equalization chamber is substantially equal to the diameter of the shock absorber, the shock absorber according to the present invention offers the further advantage that it may be constructed of shorter length.

Accordingly, it is an object of the present invention to provide a hydro-pneumatic shock absorber which eliminates by simple means and in an extremely reliable manner the aforementioned disadvantages encountered with the prior art constructions.

It is another object of the present invention to provide a hydro-pneumatic telescopic shock absorber, particularly for motor vehicles which may be readily accommodated within a coil spring without requiring a separate spring disk or without endangering unnecessary filling of the equalization chamber with liquid.

Another object of the present invention resides in the provision of a hydro-pneumatic shock absorber of the type mentioned hereinabove in which relatively hard spring deflections of the vehicle may be ameliorated or prevented altogether.

A further object of the present invention resides in the provision of a hydro-pneumatic telescopic shock absorber provided with an equalization chamber which is so constructed and arranged as to protect the membrane member, separating the liquid and gas spaces, against wear and tear while at the same time permitting to impart to the shock absorber a predetermined progressive characteristic.

Still a further object of the present invention resides in the provision of a hydro-pneumatic shock absorber of the type described hereinabove which lends itself readily to a design with predetermined sensitivity.

Another object of the present invention resides in the provision of a hydro-pneumatic shock absorber which may be used not only in the horizontal position but also in any other position including a substantially vertical position thereof thereby considerably increasing its usefulness.

Still a further object of the present invention resides in the provision of a hydro-pneumatic shock absorber of the type described hereinabove, which, with all factors remaining the same, may be of shorter length than the known prior art constructions.

These and other objects, features and advantages of the present invention will become more obvious from the following description when taken in connection with the accompanying drawing which shows in the single figure thereof, for purposes of illustration only, one embodiment of a telescopic shock absorber according to the present invention which is assembled within a cylindrical coil spring.

Referring now to the single figure of the drawing which shows in longitudinal cross section one embodiment of a telescopic shock absorber in accordance with the present invention, reference numeral 1 designates therein the damping cylinder, reference numeral 2 the piston sliding within the cylinder 1 and reference numeral 3 the piston rod of the piston 2. The piston rod 3 extends outwardly of the cylinder 2 through an upper guide means 4 in the form of a cover member or the like and a seal 5. The free upper end of the piston rod 3 is provided with a connecting eye portion 6. The connecting eye portion 6 serves simultaneously as support or abutment for a spring disk 7 against which abuts one end of the coil spring 8. The opposite spring end also abuts against a spring-disk provided with a connecting eye portion 9 and a spring centering means 10.

According to the present invention, the lower spring disk consists of two hollow half-shell elements 11 and 12 connected with each other at the ends thereof which enclose therebetween a relatively shallow or flat hollow space. This hollow space is subdivided into two spaces 14 and 15 by means of a flexible membrane or diaphragm member 13 clamped between the half-shell members 11 and 12. The space 14 above the membrane or diaphragm member 13 is in open communication with the space 16 disposed below the piston 2 within the cylinder 1. A supply or filling line is connected with the space 15 by by of a closure valve 20. The space 14 and cylinder 1 are filled with oil and the space 15 with air or any other suitable gaseous medium. Additionally, the piston 2 is constructed in a manner, known per se, as throttling valve piston such that during the outward stroke thereof a relatively strong throttling effect is realized and during the inward stroke thereof only a very slight throttling effect. A plate 17 provided with large apertures or bores to produce substantially no significant throttling effect is provide at the discharge of the cylinder 1 into the space 14 which plate 17 prevents the danger that the membrane or diaphragm member 13, might with a relatively larger oil loss, be drawn into the cylinder 1 and be thereby destroyed in due course.

In order to impart to the equalization effect predetermined characteristics, the support for the diaphragm or membrane member 13 at the lower spring disk half-shell member 12 is provided with curvatures 18 at a predetermined distance *a*. For the same purpose the bottom of the half-shell member 12 may be provided with a raised portion 19, preferably a central raised portion 19 with a predetermined diameter and curvature along the outer surface thereof. The abutment of the flexible membrane or diaphragm member 13 against the curved surfaces 18 and/or 19 results in a reduction of the surface of the membrane or diaphragm member 13 subjected to gas pressure, that is, the pressure prevailing within the equalization space is increasingly distributed over an increasingly smaller surface. The effect of the abutment of the flexible membrane or diaphragm member against these curved surfaces is to restrict the size of the space 15 and consequently the volume of air therein. As a result thereof and by reason of the ever decreasing lower space 15, the outwardly directed thrust force of the piston rod corresponding to the piston rod cross section and the gas pressure is made progressive. As a result of these characteristics, a hard spring deflection of the vehicle may be alleviated or prevented depending on the design and arrangement of the surfaces 18 and/or 19 as well as by changing the distance $a$.

The operation of the hydro-pneumatic shock absorber in accordance with the present invention is believed obvious from the drawing taken with the foregoing description. As soon as the piston 2 and the piston rod 3 become immersed more deeply in the cylinders, the liquid displaced by the ever increasing piston-rod-immersion-volume escapes out of the cylinder 1 into the space 14. The flexible membrane member 13 yields to this pressure and thereby abuts against the curved surfaces 18 and 19 to an ever increasing extent. The surfaces 18 entail additionally the advantage that the flexible membrane or diaphragm member 13 is not bent about a sharp edge or corner during spring deflections.

The filling with gas of space 15 may take place by way of valve 20. Possibly the filling aperture may also be closed completely after the filling operation. However, it is also within the scope of the present invention to connect the supply line or filling line (not shown) with a pressure source (not shown) and to connect the latter with an installation (not shown) by means of which the pressure within space 15 may be selectively changed during the drive. It is possible to achieve thereby a lifting or lowering of the level of the vehicle. The sensitivity of the adjustment depends on the selected piston rod diameter.

While I have shown and described one embodiment in accordance with the present invention, it is understood that the same is not limited thereto but is susceptible of numerous changes and modifications within the spirit and scope thereof, and I, therefore, do not wish to be limited to the details shown and described herein but intend to cover all such changes and modifications as are encompassed by the scope of the appended claims.

I claim:
1. A hydro-pneumatic telescopic shock absorber, especially for motor vehicles, comprising:
   shock absorber means including
   liquid-containing cylinder means, piston means within said cylinder means,
   and connecting means for the shock absorber means and simultaneously constructed as equalization chamber means, said connecting means extending beyond the outer contour of the shock absorber means,
   a coil spring surrounding said cylinder and piston means,
   and said equalization chamber means serving simultaneously as spring seat for said coil spring
   means forming a second spring seat
   and said equalization chamber means including two relatively shallow, hollow shell-like means, and flexible membrane means clamped between said shell-like means and separating a gas space from the liquid space within said equalization chamber means,
   one of said two hollow shell-like means defining wall means for said gas space, said wall means having an interior central protuberance projecting in the direction of said membrane means, communicating means between said cylinder means and said liquid space, said membrane means being adapted to abut said central protuberance in response to pressure of liquid from said cylinder means.

2. A hydro-pneumatic telescopic shock absorber, especially for motor vehicles, comprising:
   liquid-containing shock absorber means,
   a coil spring surrounding said shock absorber means,
   and connecting means for the shock absorber means and simultaneously constructed as equalization chamber means, said connecting means extending beyond the outer contour of the shock absorber means,
   and said equalization chamber means serving simultaneously as spring seat for said coil spring,
   means forming a second spring seat
   and said equalization chamber means including two relatively shallow, hollow shell-like means, and flexible membrane means clamped between said shell-like means and separating a gas space from the liquid space within said equalization chamber means,
   said gas space being provided with means forming convex roll-off abutment surface means in proximity to the rim of said gas space and in the central region thereof for said membrane means,
   and fluid passage connecting means between said shock absorber means and said equalization chamber means.

3. A hydro-pneumatic telescopic shock absorber, especially for motor vehicles, comprising:
   liquid-containing shock absorber means,
   and connecting means for the shock absorber means and simultaneously constructed as equalization chamber means, said connecting means extending beyond the outer contour of the shock absorber means,
   a coil spring surrounding said shock absorber means,
   and said equalization chamber means serving simultaneously as spring seat for said coil spring,
   means forming a second spring seat
   and said equalization chamber means including two relatively shallow, hollow shell-like means, and flexible membrane means clamped between said shell-like means and separating a gas space from the liquid space within said equalization chamber means,
   said gas space being provided with means forming roll-off abutment surface means in proximity to the rim of said gas space and in the central region thereof for said membrane means,
   said roll-off abutment surface means comprising a raised convex portion protruding centrally from the interior wall of one of said shell-like means,
   and protective means for said membrane means in the form of a plate provided with relatively large apertures and located between and operably connecting said shock absorber means and said equalization space.

4. In a hydro-pneumatic telescopic liquid-containing shock absorber, especially for motor vehicles, having a cylinder, a piston within said cylinder and an equalization chamber housing provided with a flexible member subdividing the liquid space from a gas space and of external contours larger than the outer diameter of the cylinder, and a spring surrounding said cylinder,
   the improvement essentially consisting of constructing the equalization chamber housing simultaneously as spring-seat for said coil spring,
   means forming a second spring seat,
   said equalization chamber housing being composed of two relatively flat hollow shells and a flexible membrane clamped between said shells and separating the gas space from the liquid space and in said equalization chamber,
   fluid passage connecting means between said cylinder and said equalization chamber means,
   and abutment surface means within the gas space of said equalization chamber housing located within the path of said flexible member during deflections by the displaced liquid in said liquid space for imparting a progressive characteristic to the shock absorber, said abutment surface means comprising a raised convex surface portion on an interior wall of one of said two flat, hollow shells, said raised convex portion extending toward the central portion of said flexible member.

5. A hydro-pneumatic telescopic shock absorber, especially for motor vehicles comprising:

liquid-containing shock absorber means including cylinder means and piston means slidably received within said cylinder means, a coil spring surrounding said cylinder and piston means, and connecting means constructed as equalization chamber means and extending beyond the diameter of the shock absorber, fluid passage connecting means between said equalization chamber means and said cylinder means, said equalization chamber means serving simultaneously as spring seat for said coil spring and including two relatively flat shell-like members, and flexible membrane means clamped between said shell-like members and separating a gas space from the liquid space within said equalization chamber means, and means including a supply means in the wall portion of equalization chamber means opposite the coil spring and spring-loaded valve means in said supply means for filling the gas space with a gaseous medium, the exterior of said wall portion being provided with connecting means and the interior of said wall portion being provided with centrally disposed convex abutment means for said flexible membrane means.

6. A hydro-pneumatic telescopic shock absorber, especially for motor vehicles comprising:

liquid-containing shock absorber means including cylinder means and piston means slidably received within said cylinder means, a coil spring surrounding said cylinder means, and connecting means constructed as equalization chamber means and extending beyond the diameter of the shock absorber, said equalization chamber means serving simultaneously as spring seat for said coil spring and including two relatively flat shell-like members, and flexible membrane means clamped between said shell-like members and separating a gas space from the liquid space within said equalization chamber means, said gas space being provided with means forming convex roll-off abutment surface means at least in proximity to the central portion of said membrane means, protective means in the form of a plate provided with relatively large apertures for said membrane means and located between and operably connecting one end of cylinder means and said equalization space, means including a supply means in the wall portion of the equalization chamber means opposite the coil spring and spring-loaded valve means in said supply means for filling the gas space with a gaseous medium, and means forming a second spring seat.

7. A hydro-pneumatic telescopic shock absorber, especially for motor vehicle comprising:

a liquid-containing shock absorber, a spring surrounding said shock absorber, and a connecting structure for said shock absorber which is constructed as equalization chamber and extends beyond the diameter of the shock absorber, said equalization chamber having support means rigid therewith and serving simultaneously as spring seat for said coil spring and including two relatively flat hollow members, and flexible membrane means clamped between said members and separating a gas space from the liquid space within said equalization chamber, said gas space being provided with means forming convex abutment surface means for said membrane means along which rolls off said membrane means, said convex abutment surface means being disposed adjacent the central portion of said membrane means, protective means provided with relative large apertures for said membrane means and located between and operably connecting said shock absorber and said equalization space, and means forming a second seat.

8. A hydrodynamic telescopic shock absorber for motor vehicles comprising a liquid-containing cylinder and a piston rod having a piston slidable within said cylinder, one end of said piston rod protruding from one end of said cylinder and being provided with a connecting lug portion, connecting means for said shock absorber at one end of said cylinder, said connecting means comprising equalization chamber means including two chambers separated by a membrane, a plate disposed between one of said chambers and said one end, said one of said chambers communicating with said liquid-containing cylinder through passages provided in said plate, the other of said two chambers being filled with air and comprising curved surface means adapted for abutment by said membrane upon flexure thereof responsive to pressure of liquid from said cylinder, said connecting means being generally in the form of a disk, a helical spring surrounding said cylinder and seated on one side of said disk, a second connecting lug portion carried by the other side of said disk, and means forming a second spring seat.

9. A hydrodynamic telescopic shock absorber according to claim 8, wherein said curved surface means includes a curved raised portion extending in the direction of said membrane, said curved raised portion being disposed centrally on an interior wall of said other of said two chambers.

10. A hydrodynamic telescopic shock absorber according to claim 8, wherein said other of said two chambers is provided with a valve-controlled supply line.

References Cited by the Examiner

UNITED STATES PATENTS

| | | | |
|---|---|---|---|
| 2,856,035 | 10/58 | Rohacs. | |
| 2,946,582 | 7/60 | Martin | 267—64 |
| 3,051,470 | 8/62 | Boulet | 267—64 |

FOREIGN PATENTS

| | | |
|---|---|---|
| 1,108,365 | 8/55 | France. |
| 455,841 | 10/36 | Great Britain. |
| 821,230 | 10/59 | Great Britain. |

ARTHUR L. LA POINT, *Primary Examiner.*